(12) United States Patent
Suri et al.

(10) Patent No.: US 7,804,989 B2
(45) Date of Patent: Sep. 28, 2010

(54) OBJECT RECOGNITION SYSTEM FOR MEDICAL IMAGING

(75) Inventors: Jasit S Suri, Roseville, CA (US); Lu Li, Grass Valley, CA (US)

(73) Assignee: Eigen, Inc., Grass Valley, CA (US)

( * ) Notice: Subject to any disclaimer, the term of this patent is extended or adjusted under 35 U.S.C. 154(b) by 919 days.

(21) Appl. No.: 11/615,596

(22) Filed: Dec. 22, 2006

(65) Prior Publication Data

US 2008/0159606 A1  Jul. 3, 2008

Related U.S. Application Data

(60) Provisional application No. 60/863,505, filed on Oct. 30, 2006.

(51) Int. Cl.
G06K 9/00 (2006.01)
A61B 8/00 (2006.01)

(52) U.S. Cl. ...................... 382/128; 600/437

(58) Field of Classification Search ......... 382/128–132; 600/437; 702/189
See application file for complete search history.

(56) References Cited

U.S. PATENT DOCUMENTS

| | | |
|---|---|---|
| 5,282,472 A | 2/1994 | Companion et al. |
| 5,320,101 A | 6/1994 | Faupel et al. |
| 5,383,454 A | 1/1995 | Bucholz |
| 5,398,690 A | 3/1995 | Batten et al. |
| 5,454,371 A | 10/1995 | Fenster et al. |
| 5,531,520 A | 7/1996 | Grimson et al. |
| 5,562,095 A | 10/1996 | Downey et al. |
| 5,611,000 A | 3/1997 | Szeliski et al. |
| 5,810,007 A | 9/1998 | Holupka et al. |
| 5,842,473 A | 12/1998 | Finster et al. |
| 6,092,059 A | 7/2000 | Straforini et al. |
| 6,171,249 B1 | 1/2001 | Chin et al. |
| 6,238,342 B1 | 5/2001 | Feleppa et al. |
| 6,251,072 B1 | 6/2001 | Ladak et al. |
| 6,261,234 B1 | 7/2001 | Lin |
| 6,298,148 B1 | 10/2001 | Cline et al. |
| 6,334,847 B1 | 1/2002 | Fenster et al. |
| 6,342,891 B1 | 1/2002 | Fenster et al. |
| 6,351,660 B1 | 2/2002 | Burke et al. |
| 6,360,027 B1 | 3/2002 | Hossack et al. |
| 6,385,332 B1 | 5/2002 | Zahalka et al. |
| 6,423,009 B1 | 7/2002 | Downey et al. |

(Continued)

FOREIGN PATENT DOCUMENTS

WO  0014668  3/2000

(Continued)

*Primary Examiner*—Vu Le
*Assistant Examiner*—Amara Abdi
(74) *Attorney, Agent, or Firm*—Marsh Fischmann & Breyfogle LLP

(57) ABSTRACT

An improved system and method (i.e. utility) for segmentation of medical images is provided. The utility fits an estimated boundary on a structure of interest in an automated selection and fitting process. The estimated boundary may be a model boundary that is generated actual boundaries of like structures. In one arrangement, the boundaries may be selected based on the age and/or ethnicity of a patient. In further arrangements, narrow band processing is performed to estimate the actual boundary of the structure of interest.

17 Claims, 19 Drawing Sheets

U.S. PATENT DOCUMENTS

| | | |
|---|---|---|
| 6,447,477 B2 | 9/2002 | Burney et al. |
| 6,500,123 B1 | 12/2002 | Holloway et al. |
| 6,561,980 B1 | 5/2003 | Gheng et al. |
| 6,567,687 B2 | 5/2003 | Front et al. |
| 6,610,013 B1 | 8/2003 | Fenster et al. |
| 6,611,615 B1 | 8/2003 | Christensen |
| 6,674,916 B1 | 1/2004 | Deman et al. |
| 6,675,032 B2 | 1/2004 | Chen et al. |
| 6,675,211 B1 | 1/2004 | Mamaghani et al. |
| 6,689,065 B2 | 2/2004 | Aksnes et al. |
| 6,778,690 B1 | 8/2004 | Ladak et al. |
| 6,824,516 B2 | 11/2004 | Batten et al. |
| 6,842,638 B1 | 1/2005 | Suri et al. |
| 6,852,081 B2 | 2/2005 | Sumanaweera et al. |
| 6,909,792 B1 | 6/2005 | Carrott et al. |
| 6,952,211 B1 | 10/2005 | Cote et al. |
| 6,985,612 B2 | 1/2006 | Hahn |
| 7,004,904 B2 | 2/2006 | Chalana et al. |
| 7,008,373 B2 | 3/2006 | Stoianovici et al. |
| 7,039,216 B2 | 5/2006 | Shum et al. |
| 7,039,239 B2 | 5/2006 | Loui et al. |
| 7,043,063 B1 | 5/2006 | Noble et al. |
| 7,095,890 B2 | 8/2006 | Paragios et al. |
| 7,119,810 B2 | 10/2006 | Sumanaweera et al. |
| 7,139,601 B2 | 11/2006 | Bucholz et al. |
| 7,148,895 B2 | 12/2006 | Konishi et al. |
| 7,155,316 B2 | 12/2006 | Sutherland et al. |
| 7,162,065 B2 | 1/2007 | Ladak et al. |
| 7,167,760 B2 | 1/2007 | Dawant et al. |
| 7,225,012 B1 | 5/2007 | Susil et al. |
| 7,274,811 B2 | 9/2007 | Sirohey et al. |
| 7,302,092 B1 | 11/2007 | Fenster et al. |
| 7,403,646 B2 | 7/2008 | Sato |
| 2003/0000535 A1 | 1/2003 | Galloway, Jr. et al. |
| 2003/0135115 A1 | 7/2003 | Burdette et al. |
| 2004/0210133 A1 | 10/2004 | Nir |
| 2005/0135663 A1* | 6/2005 | Okada et al. ............... 382/128 |
| 2005/0159676 A1 | 7/2005 | Taylor et al. |
| 2005/0190189 A1 | 9/2005 | Chefd'hotel et al. |
| 2005/0197977 A1 | 9/2005 | Buck et al. |
| 2005/0243087 A1 | 11/2005 | Aharon |
| 2005/0249398 A1 | 11/2005 | Khamene et al. |
| 2006/0002601 A1 | 1/2006 | Fu et al. |
| 2006/0002630 A1 | 1/2006 | Fu et al. |
| 2006/0013482 A1 | 1/2006 | Dawant et al. |
| 2006/0036162 A1 | 2/2006 | Shahidi et al. |
| 2006/0079771 A1 | 4/2006 | Nir |
| 2006/0197837 A1 | 9/2006 | Flath et al. |
| 2006/0227131 A1 | 10/2006 | Schiwietz et al. |
| 2006/0258933 A1 | 11/2006 | Ellis et al. |
| 2007/0014446 A1 | 1/2007 | Sumanaweera et al. |
| 2007/0040830 A1 | 2/2007 | Papageorgiou |
| 2007/0116339 A1 | 5/2007 | Shen |
| 2007/0116381 A1 | 5/2007 | Khamene |
| 2007/0189603 A1 | 8/2007 | Kasperkiewicz et al. |
| 2007/0201611 A1 | 8/2007 | Pratx et al. |
| 2007/0270687 A1 | 11/2007 | Gardi et al. |
| 2008/0002870 A1 | 1/2008 | Farag et al. |
| 2008/0123910 A1 | 5/2008 | Zhu |
| 2008/0123927 A1 | 5/2008 | Miga et al. |
| 2008/0170770 A1 | 7/2008 | Suri et al. |
| 2008/0247616 A1 | 10/2008 | Pescatore et al. |
| 2009/0093715 A1 | 4/2009 | Downey et al. |

FOREIGN PATENT DOCUMENTS

| | | | |
|---|---|---|---|
| WO | WO 2005/107601 | * | 5/2005 |
| WO | 2006089426 A1 | | 8/2006 |
| WO | 2008062346 A1 | | 5/2008 |
| WO | 2008124138 A1 | | 10/2008 |

* cited by examiner

2D Image Storage

3D Volume Image though possibly not visible. Page 1/2 of US 7,804,989 B2.

OBJECT RECOGNITION SYSTEM FOR MEDICAL IMAGING

CROSS REFERENCE TO RELATED APPLICATION

This application claims priority under 35 U.S.C. §119 to U.S. Provisional Application No. 60/863,505 entitled: "Object Recognition System" and having a filing date of Oct. 30, 2006, the entire contents of which are incorporated herein by reference.

FIELD

The present disclosure pertains to the field of medical imaging, and more particular to the segmentation of medical images to allow for accurate calculation of the volumes of structures of interest within the medical images.

BACKGROUND

Medical imaging, including X-ray, magnetic resonance (MR), computed tomography (CT), ultrasound, and various combinations of these techniques are utilized to provide images of internal patient structure for diagnostic purposes as well as for interventional procedures. One application of medical imaging (e.g., 3D imaging) is the measurement of volume and/or assessment of shape of internal structures of interest. These measurements typically require segmentation of image data, to separate structures of interest from the background, such that accurate calculations may be made.

One area where measurement of shape and volume is utilized is in the detection of prostate cancer. As will be appreciated, prostate cancer is one of the most common types of cancer among American men. Typically for a physician to diagnose prostate cancer, a biopsy of the prostate is performed. Biopsies are typically performed on patients that have either a suspect digital rectal exam (DRE) or abnormal PSA levels. PSA or 'prostate-specific antigen' is a protein produced by the cells of the prostate gland. A PSA test measures the level of PSA in the blood. In this regard, a doctor takes a blood sample, and the amount of PSA is measured in a laboratory.

Volume assessment of the prostate is an important and integral part of the decision to perform a biopsy. That is, the decision to perform biopsy in patients with abnormal PSA levels can be bolstered by PSA density (PSAD), which is defined as the PSA level divided by the prostate volume. In this regard, an expected PSA value may be based at least in part on the volume of a given prostate volume. The volume of the prostate gland can also be used to determine treatment options. Accordingly, it is important to identify the boundaries of the prostate from a medical image such that an accurate volume determination of the prostate can be made.

In addition, biopsy of the prostate requires guidance to a desired location. Such guidance may be provided by transrectal ultrasound imaging (TRUS). In such an application, a 3D image of the prostate may be generated to allow guidance of a biopsy needle to a prostate location of interest. As with volume determination. it is important that the boundaries of the prostate are identified from a medical image in order to allow for accurate biopsy guidance.

Unfortunately, boundary identification (e.g., segmentation) in medical images is sometimes difficult. Even manual segmentation of medical images, such as ultrasound images, is difficult given the low signal to noise ratio and the presence of imaging artifacts.

SUMMARY OF THE INVENTION

Segmentation of the ultrasound prostate images is a very challenging task due to the relatively poor image qualities. In this regard, segmentation has often required a technician to at least identify an initial boundary of the prostate such that one or more segmentation techniques may be implemented to acquire the actual boundary of the prostate. Generally, such a process of manual boundary identification and subsequent processing has made real time imaging (e.g., generating a segmented image while a TRUS remains positioned)of the prostate impractical. Rather images have been segmented after an imaging procedure to identify structures of interest. Accordingly, subsequent biopsy would require repositioning of a TRUS and alignment of the previous image with a current position of the prostate.

According to a first aspect, a system and method (i.e., utility) is provided for obtaining a boundary of the structure within a medical image. The method includes obtaining a medical image that includes a structure of interest therein. An initial estimate of the boundary of the structure of interest is provided, wherein the initial estimate is based on a predetermined model. Based on this initial boundary, a band region is generated that includes the actual boundary of the structure. This region is then processed to generate an estimation of the actual boundary of the structure. In one arrangement, such processing includes the use of active contours within the band region to capture the actual boundary of the structure.

The utility may be utilized with any medical images. In one arrangement, such medical images include ultrasound images. Likewise, the utility may be utilized to identify any structure of interest. In one arrangement, the structure of interest is a prostate gland.

The predetermined models may provide an initial boundary that may be fitted to a boundary region of the image. That is, while the actual boundary may not be readily discernible the region in which the boundary lays may be identified. In one arrangement, the predetermined models are based on a plurality of stored boundaries that may be determined from actual patient data. For instance, a plurality of patients may provide ultrasound images and these ultrasound images may be segmented to identify boundaries within each image. These predetermined boundaries may provide an adequate boundary estimation to allow for subsequent automated boundary identification. That is, by providing the boundary estimate based on predetermined models, the present utility may be performed in an automated procedure.

The initial estimate the boundary, based on a predetermined boundary model may be fit to the image. In this regard, a center of the predetermined boundary model and the center of the structure of interest may be aligned. Measurements between the center point and the edges of the boundary model may be determined in order to generate a plurality of points around the model boundary. These points may be utilized to generate a curve or contour that may then be processed to capture the actual boundary of the structure.

In another aspect, an improved system and method (i.e. utility) for segmentation on prostate ultrasound images is introduced. The utility minimizes the energy function of an initial contour/boundary that is placed on the prostate image in an automated selection and fitting process (e.g., initialization). The energy function of the contour is minimized based on the regional information of the image as well as the shape information of the contour, and each term in the energy functional represent a certain weighted "energy". A level set framework is applied, in which the contour is represented implicitly, while the necessary re-initialization step in the traditional level set method is totally eliminated. The final level set function which contains the edge information will be obtained by a finite difference (the steepest descent search) calculation scheme.

Generally, the system works as the following way: a predetermined boundary is fit to a prostrate image, in one arrangement a trained user selects a few points inside the prostate region of the image to allow for the automated fitting of the predetermined boundary; in another arrangement, the region inside the prostrate is identified in an automated process based, for example on the uniformity of the pixels inside the prostrate. The predetermined boundaries may include prostrate boundary models. Such model may be generated from actual prostrate image and stored for use in the present utility. After the initial boundary is selected a narrow band mask which includes the real boundary of the prostate will be generated. Then all the calculations of terms included in the finite difference update process will be carried out in this new domain (e.g., narrow band mask). After steps of iterations, the finite difference will converge due to the "balanced" regions by the different weighs in the cost function. The final edges can be estimated by smoothing the obtained contour (e.g.,.. the converged contour). This utility is stable and easy for the chosen of initial condition, and use of penalized terms in the energy function of the contour limit the speed of expansion of the contour to ensure there no "split" or "blooding" before the convergence state is reached.

According to another aspect, a system and method for use in obtaining a boundary of a structure within ultrasound image is provided. The utility includes obtaining an ultrasound image of a patient where the ultrasound image includes a structure of interest. Additionally, the utility receives an input regarding demographic information associated with the patient. Based on the demographic information, an initial estimate of a boundary of the structure of interest is provided.

In one arrangement, providing an initial estimate of the boundary includes selecting a predetermined boundary model that is based on the demographic information. In this regard, is been determined that in many instances internal structure of interest, such as prostates, may have common characteristics for demographically similar individuals. Such demographics may include age, ethnicity, height, weight etc. That is, boundary information of a patient may be similar to another patient having similar demographic characteristics. Accordingly, stored boundary information from demographically similar individuals may be utilized to provide an initial boundary estimate.

A related aspect provides a system and method for use in obtaining boundary information of a structure within a medical image. The utility includes obtaining a plurality of medical images from plurality of different patients wherein each image includes a common structure of interest. For instance, such images may each include a prostate, breast or other structure of interest. Each of the images may be segmented to generate a plurality of segmented images where and boundary of the structure of interest in each image is known. These segmented images may then be stored in a database wherein each segmented image is indexed to demographic information associated with the patient from which the ultrasound image originated. As will be appreciated, such stored segmented images may be utilized in subsequent procedures to provide an initial boundary estimate of a similar structure of interest for a patient having similar demographic characteristics

BRIEF DESCRIPTION OF THE DRAWINGS

FIG. 2b illustrates two-dimensional images generated by the TRUS of FIG. 2a.

FIG. 16b illustrate the implementation of the calculation of FIG. 16a.

DETAILED DESCRIPTION

Reference will now be made to the accompanying drawings, which assist in illustrating the various pertinent features of the present disclosure. Although the present disclosure is described primarily in conjunction with transrectal ultrasound imaging for prostate imaging, it should be expressly understood that aspects of the present invention may be applicable to other medical imaging applications. In this regard, the following description is presented for purposes of illustration and description.

Disclosed herein are systems and methods that allow for obtaining ultrasound images and identifying structure of interest from those images. In this regard, a segmentation algorithm is utilized to analyze the images such that structures of interest may be delineated from background within the image. Specifically, in the application disclosed herein, a segmentation algorithm is provided that is utilized to delineate a prostrate gland such that volume and/or shape of the prostrate may be identified and/or a biopsy may be taken from a desired location of the prostrate gland.

Figure 1:
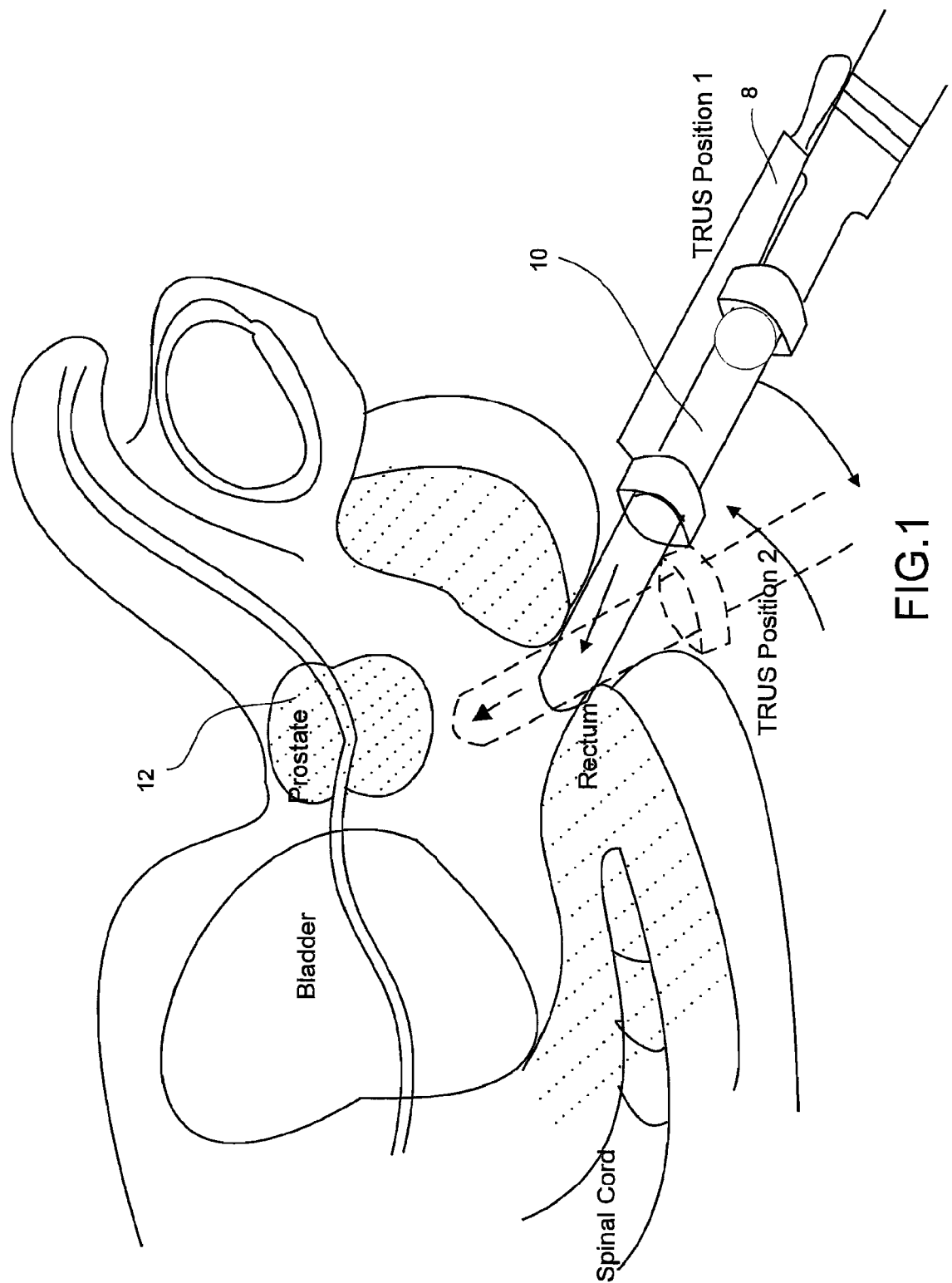
FIG. 1 shows a cross-sectional view of a trans-rectal ultrasound imaging system as applied to perform prostate imaging.

FIG. 1 illustrates a transrectal ultrasound probe that may be utilized to obtain a plurality of two-dimensional ultrasound images of the prostate 12. As shown, the probe 10 may be operative to automatically scan an area of interest. In such an arrangement, a motor may sweep the transducer (not shown) of the ultrasound probe 10 over a radial area of interest. Accordingly, the probe 10 may acquire plurality of individual images while being rotated through the area of interest (See FIGS. 2A-C). Each of these individual images may be represented as a two-dimensional image. Initially, such images may be in a polar coordinate system. In such an instance, it may be beneficial for processing to translate these images into a rectangular coordinate system. In any case, the two-dimensional images may be combined to generate a three-dimensional image (See FIG. 2C).

Figure 2A:
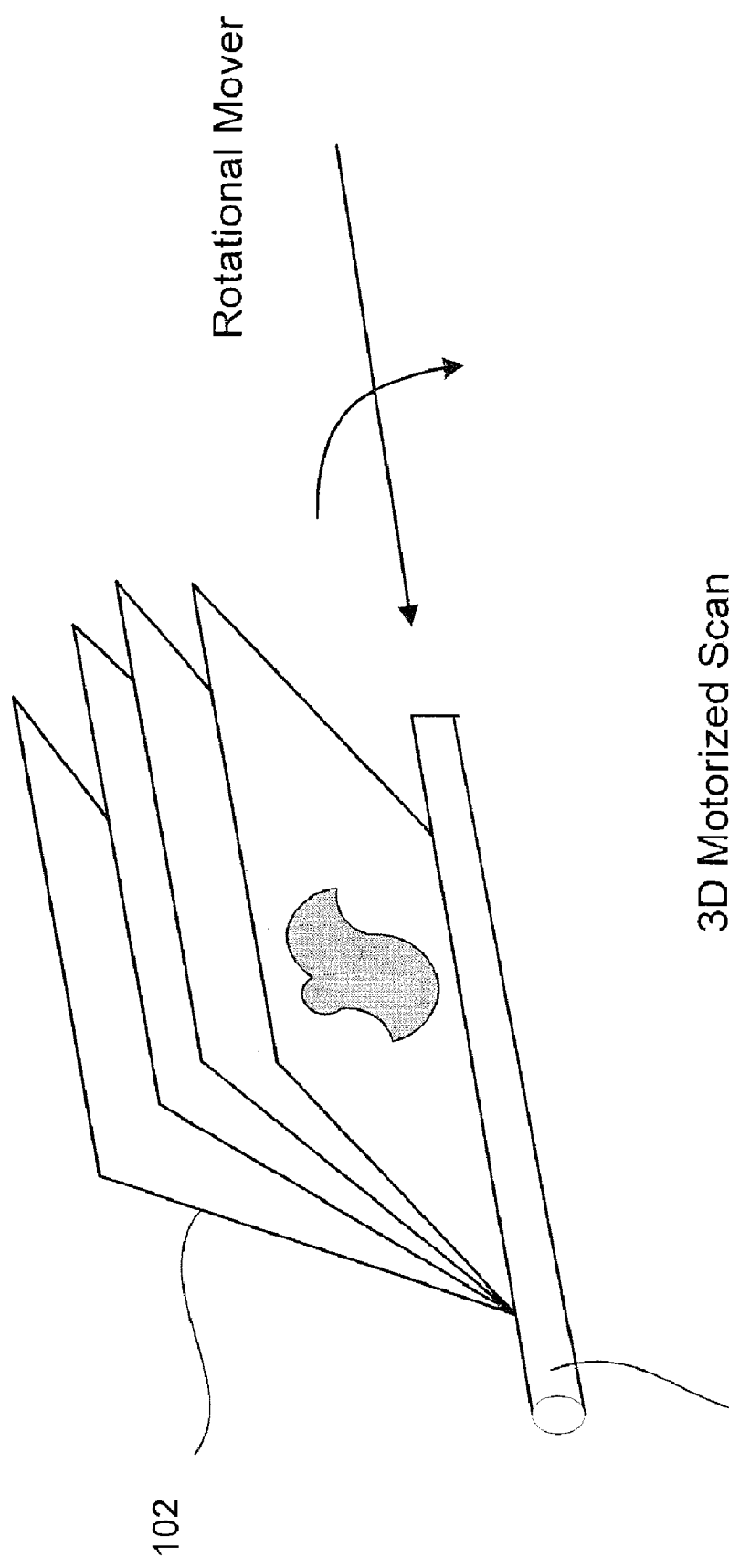
FIG. 2a illustrates a motorized scan of the TRUS of FIG. 1.
Figure 2B:
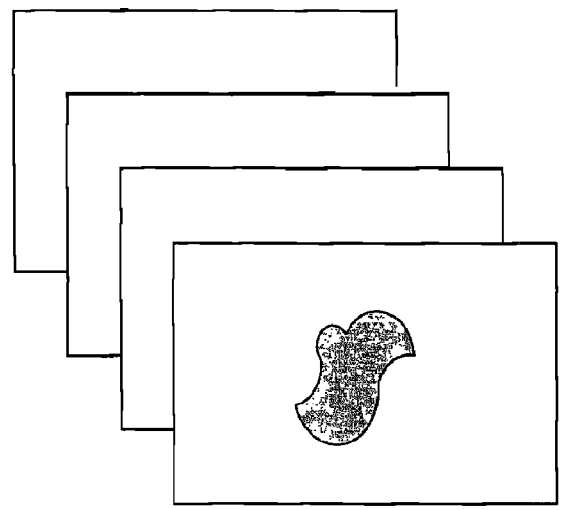
Figure 2C:
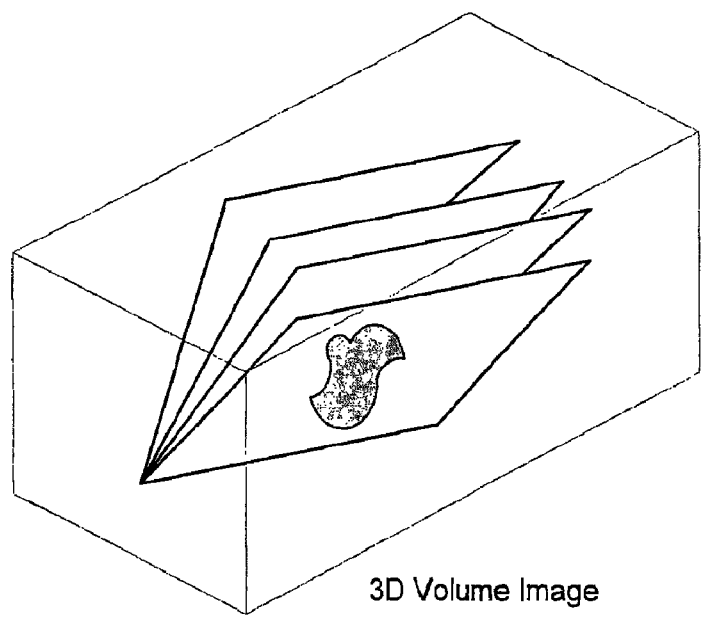
FIG. 2c illustrates a 3-D volume image generated from the two dimensional images of FIG. 2b.

As shown in FIG. 2A, the ultrasound probe 10 is a side scan probe. However, it will be appreciated that an end scan probe may be utilized as well. In any arrangement, the probe 10 may also include a biopsy gun 8 that may be attached to the probe. Such a biopsy gun 8 may include a spring driven needle that is operative to obtain a core from desired area within the prostate. In this regard, it may be desirable to generate an image of the prostate 12 while the probe 10 remains positioned relative to the prostate. In this regard, if there is little or no movement between acquisition of the images and generation of the 3D image, the biopsy gun may be positioned to obtain a biopsy of an area of interest within the prostate 12.

In order to generate an accurate three-dimensional image of the prostate for biopsy and/or other diagnostic purposes, the present disclosure provides an improved method for segmentation of ultrasound images. In particular, the system utilizes a narrow band estimation process for identifying the boundaries of a prostate from ultrasound images. As will be appreciated, ultrasound images often do not contain sharp boundaries between a structure of interest and background of the image. That is, while a structure, such as a prostate, may be visible within the image, the exact boundaries of the structure may be difficult to identify in an automated process. Accordingly, the system utilizes a narrow band estimation system that allows the specification of a limited volume of interest within an image to identify boundaries of the prostate since rendering the entire volume of the image may be too slow and/or computationally intensive. However, to allow automation of the process, the limited volume of interest and/or an initial boundary estimation for ultrasound images may be specified based on predetermined models that are based on age, ethnicity and/or other physiological criteria.

Figure 3A:
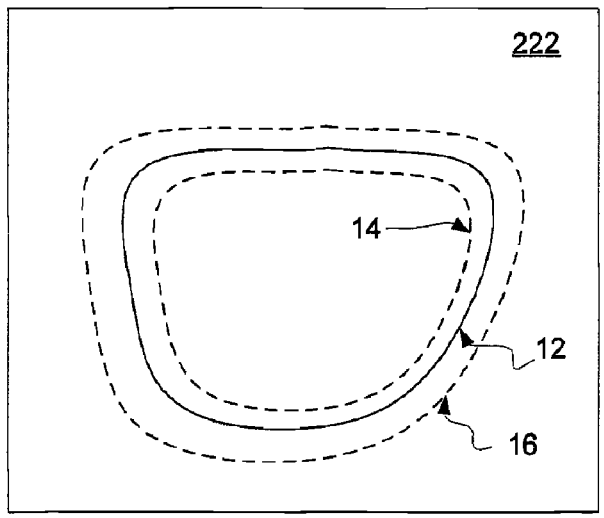
FIG. 3a illustrates a two-dimensional prostate image.

FIG. 3a illustrates a prostate within an ultrasound image. In practice, the boundary of the prostate 12 would not be as clearly visible as shown in FIG. 3a. In order to perform a narrow band volume rendering, an initial estimate of the boundary must be provided. As will be discussed herein, this initial estimation may be provided using a predetermined model (e.g., stored data) which may be based on age and/or ethnicity of the patient. In any case, the stored data may be provided to generate an initial contour or boundary 14. Accordingly, a second boundary 16 may be provided in a spaced relationship to the initial band 14. Accordingly, the space between these boundaries 14 and 16 may define a band (i.e., the narrow band) having a limited volume of interest in which rendering may be performed to identify the actual boundary of the prostate 12. It will be appreciated that the band between the initial boundary 14 and outer boundary 16 should be large enough such that the actual boundary of the prostate lays within the band. As will be discussed herein, active contours or dynamic curves are utilized within the narrow band to identify to the actual boundary of the prostate 12.

As discussed herein, a boundary estimation system is provided for computing the boundary of the individual sound images (e.g., individual images or slices of a plurality of images that may be combined together to generate a volume). The boundary estimation system is operative to generate boundary information slice by slice for an entire volume. Accordingly, once the boundaries are determined, volumetric information may be obtained and/or a detailed image may be created for use in, for example, guiding a biopsy needle. Further, the system operates quickly, such that the detailed image may be generated while a TRUS probe remains positioned relative to the prostrate. That is, an image may be created in substantially real-time.

Inputs of the system include known 3-D ultrasound volumes and/or slices having known boundaries. These known inputs are utilized for generating an initial boundary on an image received from a on-line patient (i.e., undergoing an imaging procedure). These known boundaries are generated by a trained ultrasound operator who manually tracks the boundaries of prostrates in multiple images and stores the known images and boundaries in a database. The system is operative to utilize these stored ultrasound images and boundaries with ultrasound images acquired from a current patient in order to generate an initial estimated boundary for a current ultrasound image. That is, the system fits an initial boundary to the prostate in each ultrasound image and then deforms the initial boundary to capture the actual boundary of the prostrate.

Figure 4:
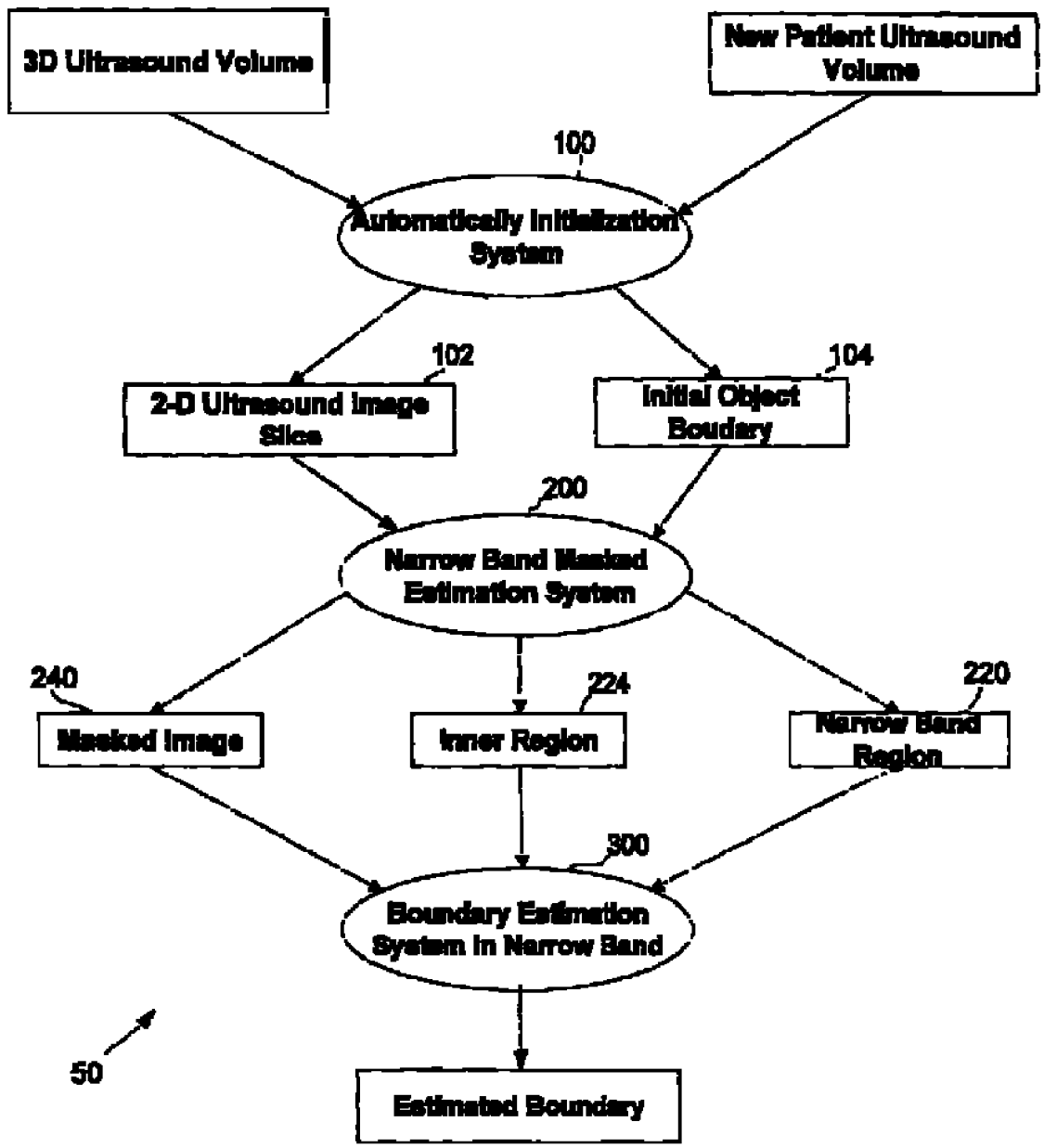
FIG. 4 illustrates a process flow diagram of an overview of the boundary estimation system.

FIG. 4 illustrates an overall process flow diagram of the boundary estimation system 50. As shown, known 3-D ultrasound volumes and/or images having known boundaries (i.e., stored volumes) and a newly acquired ultrasound volume/image are provided to an automatic initialization system 100. The automatic initialization system 100 generates an initial object boundary for each two-dimensional ultrasound image slice. The automatic initialization system 100 passes the ultrasound image slice 102 and initial object boundary 104 to a narrow band mask estimation system 200. The narrow band estimation system 200 generates a narrow band mask image 240, inner and outer region images 224, 222 and a narrow band region 220 to the narrow band boundary estimation system 300. Utilizing this information, the narrow band boundary estimation system 300 segments the image to determine the actual boundary of the prostate within the ultrasound image. Details of each of these systems 100, 200, 300 are discussed herein. Specifically, the automatic initialization system 100 is discussed in relation to FIGS. 5-8. The narrow band mask estimation system 200 is discussed in relation to FIGS. 9 and 10. Finally, the narrow band boundary estimation system 300 is discussed in relation to FIGS. 11-20.

Figure 5:
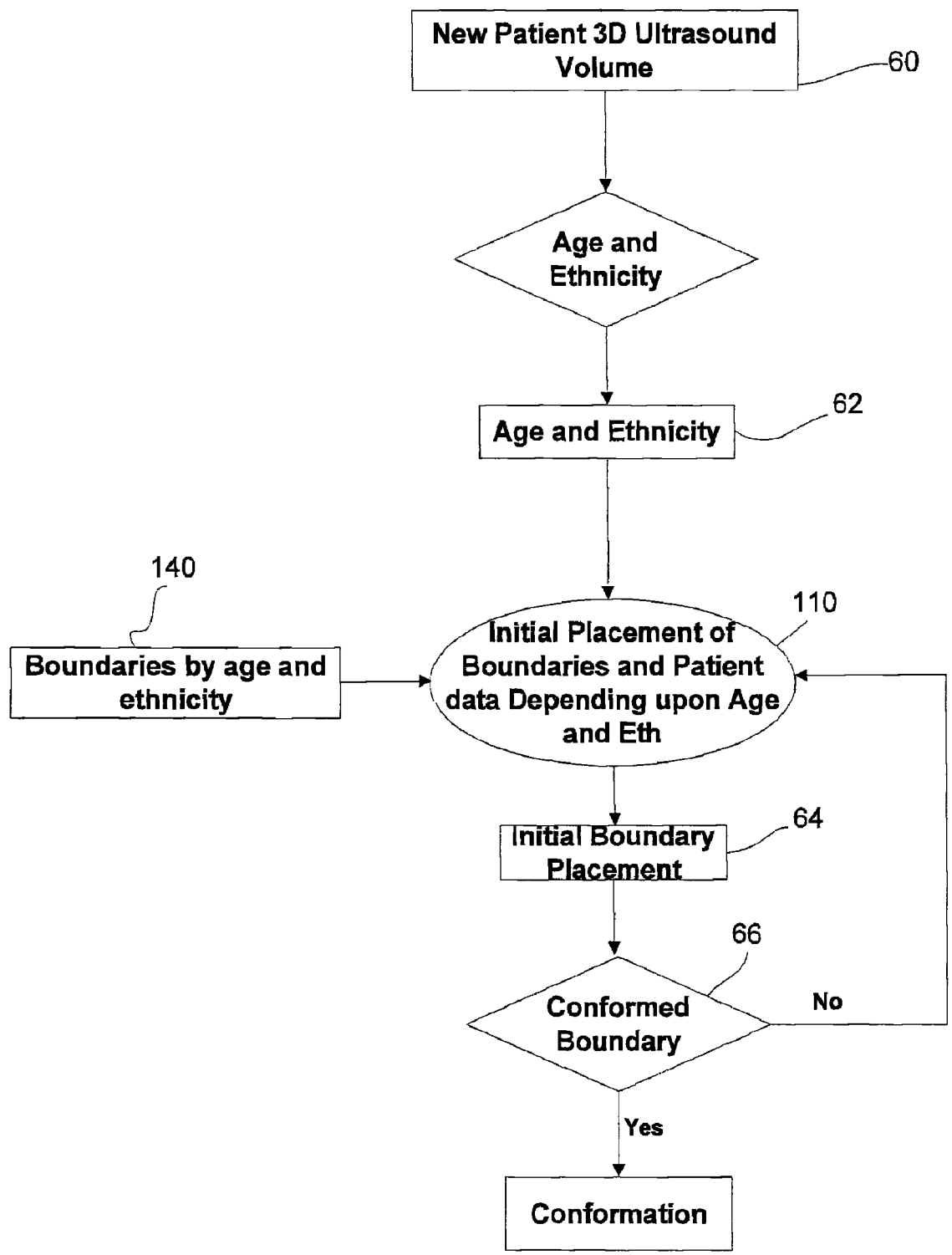
FIG. 5 illustrates a process flow diagram for an automatic initialization system.

FIG. 5 shows a process flow diagram of the automatic initialization system 100. Generally, the automatic initialization system 100 receives a new patient 3-D ultrasound volume 60 and request an entry of age and ethnicity 62. Once the age and ethnicity is input into the system, placement of initial boundaries performed for each slice of the new patient 3-D ultrasound volume 60 in a matching process 110. In order to perform the initial placement of boundaries, the process 110 obtains previously stored boundary values, which are sorted by age and ethnicity. In this regard, it has been determined that prostate volumes and shapes can be categorized by age and/or ethnicity in order to generate a set of predetermined boundaries that may be utilized in an automated process to establish an initial boundary on a new patient ultrasound image. The initial boundaries 140 from the stored boundary values may be generated by a trained technician, as discussed in relation to FIG. 6.

Figure 6:
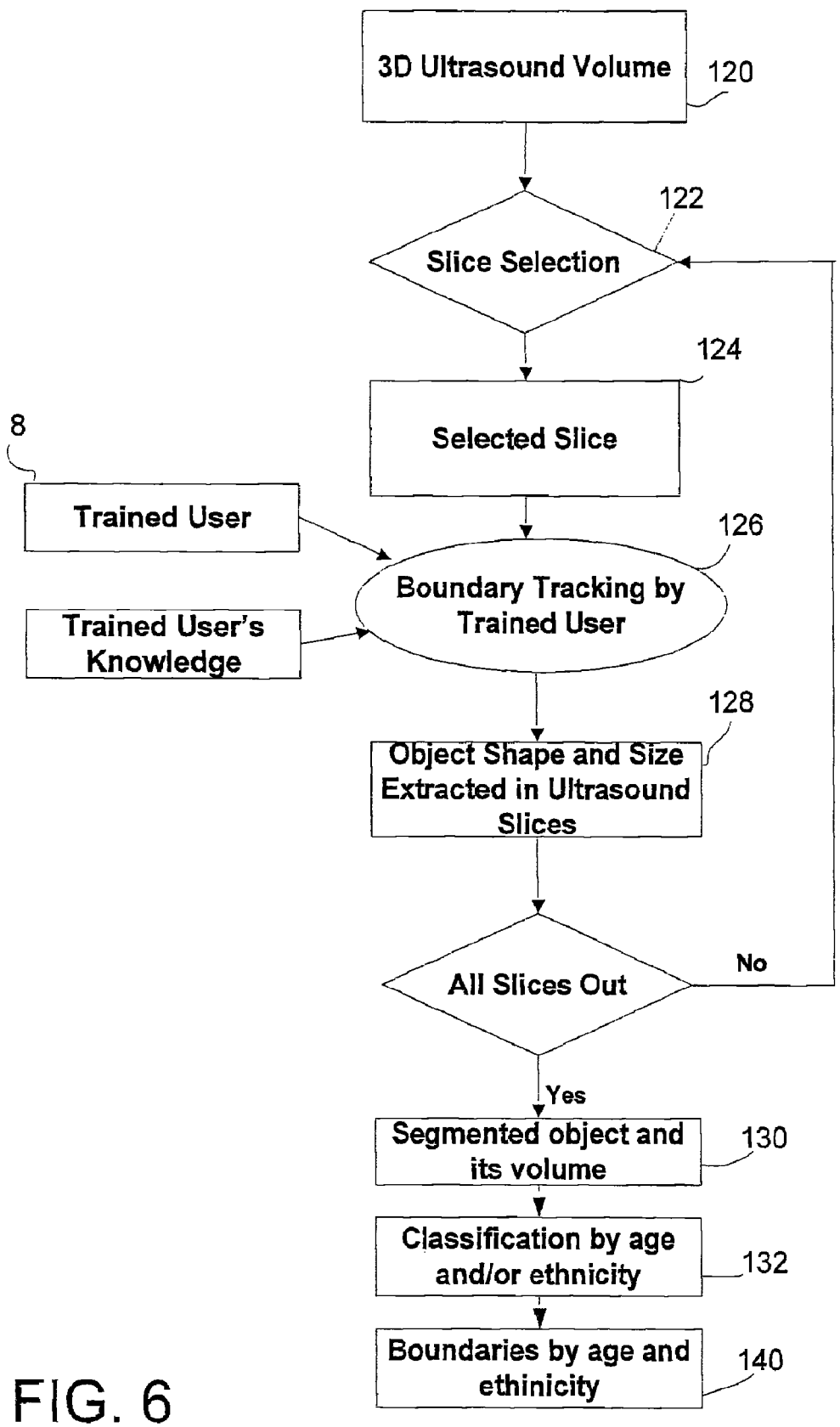
FIG. 6 illustrates a process flow diagram for a training system for generating initial boundary data for use by the initialization system.

As shown in FIG. 6, a system for generating boundaries by age and ethnicity is provided. Initially, a 3-D ultrasound volume 120 is received. The initial ultrasound volume 120 is separated 122 into a plurality of individual slices. The initial slice is selected 124 by a trained user who is knowledgeable in identifying structure within ultrasound images. Accordingly, the trained user manually tracks 126 the boundary within the image. This boundary may then be extracted 128 in the ultrasound slice. This process may be repeated until all slices are tracked by the trained user. Accordingly, this manual boundary tracking or segmentation allows for generation of a segmented object and its volume 130. This segmented object and its volume 130 may then be classified 132 by age and/or ethnicity. The results may be stored to a database that includes boundaries by age and ethnicity 140. As will be appreciated, the process of FIG. 6 may be performed numerous times on numerous different 3-D ultrasound images 120 associated with subjects/patients of different ages and ethnicities in order to generate a database having a plurality of boundaries indexed by age and/or ethnicity.

Figure 7:
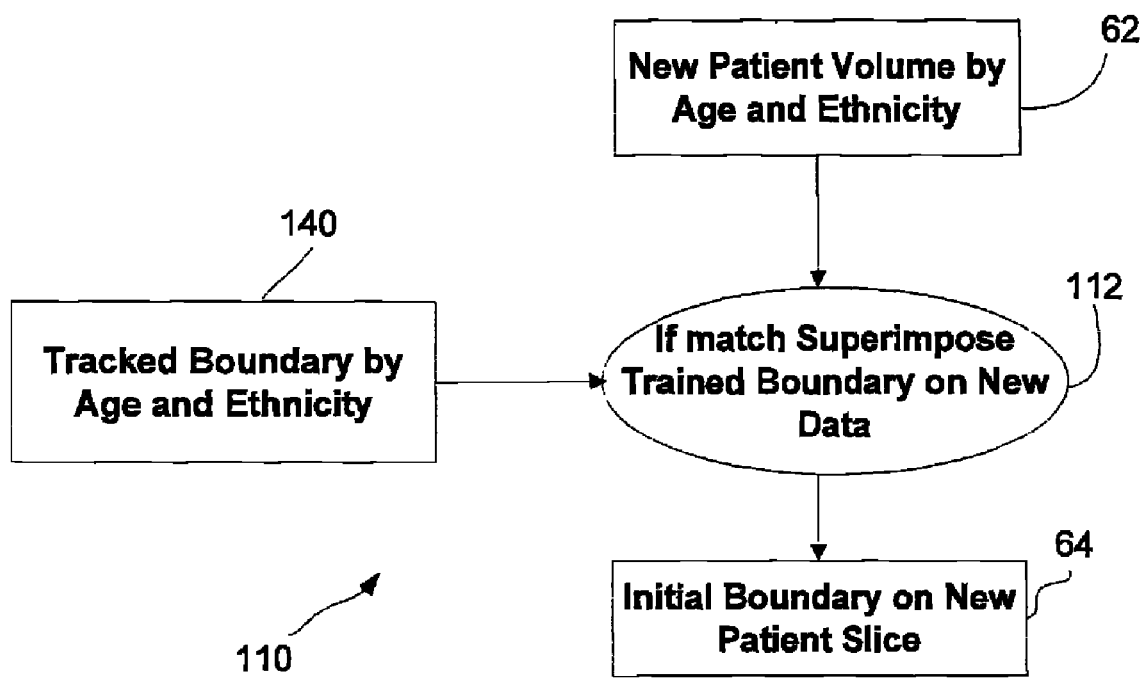
FIG. 7 illustrates a process flow diagram for initial boundary replacement on a two-dimensional sound image.

Referring again to FIG. 5, it is noted that the process for initial placement of boundaries 110 receives the boundary and age information 140. FIG. 7 illustrates the initial placement of boundaries process 110. As shown, a matching process 112 is performed to superimpose a stored/tracked boundary onto the new patient image. Accordingly, the new patient image together with the stored boundary will be analyzed by the closeness of matching. If sufficient, the initial boundary for the current image is obtained 64. Such selection may be performed on a slice-by-slice basis until each slice of the new patient ultrasound volume/image 60 is matched with a stored boundary 140.

Figure 3B:
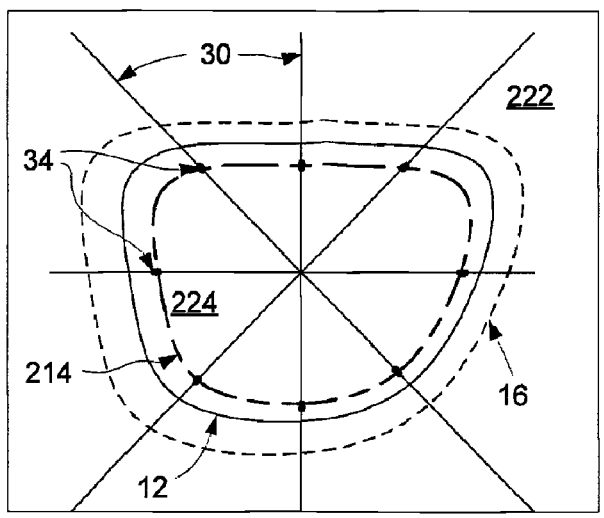
FIG. 3b illustrates the two-dimensional prostate image of 3a having radial lines extending from an identified center point and a narrow band region.
Figure 8:
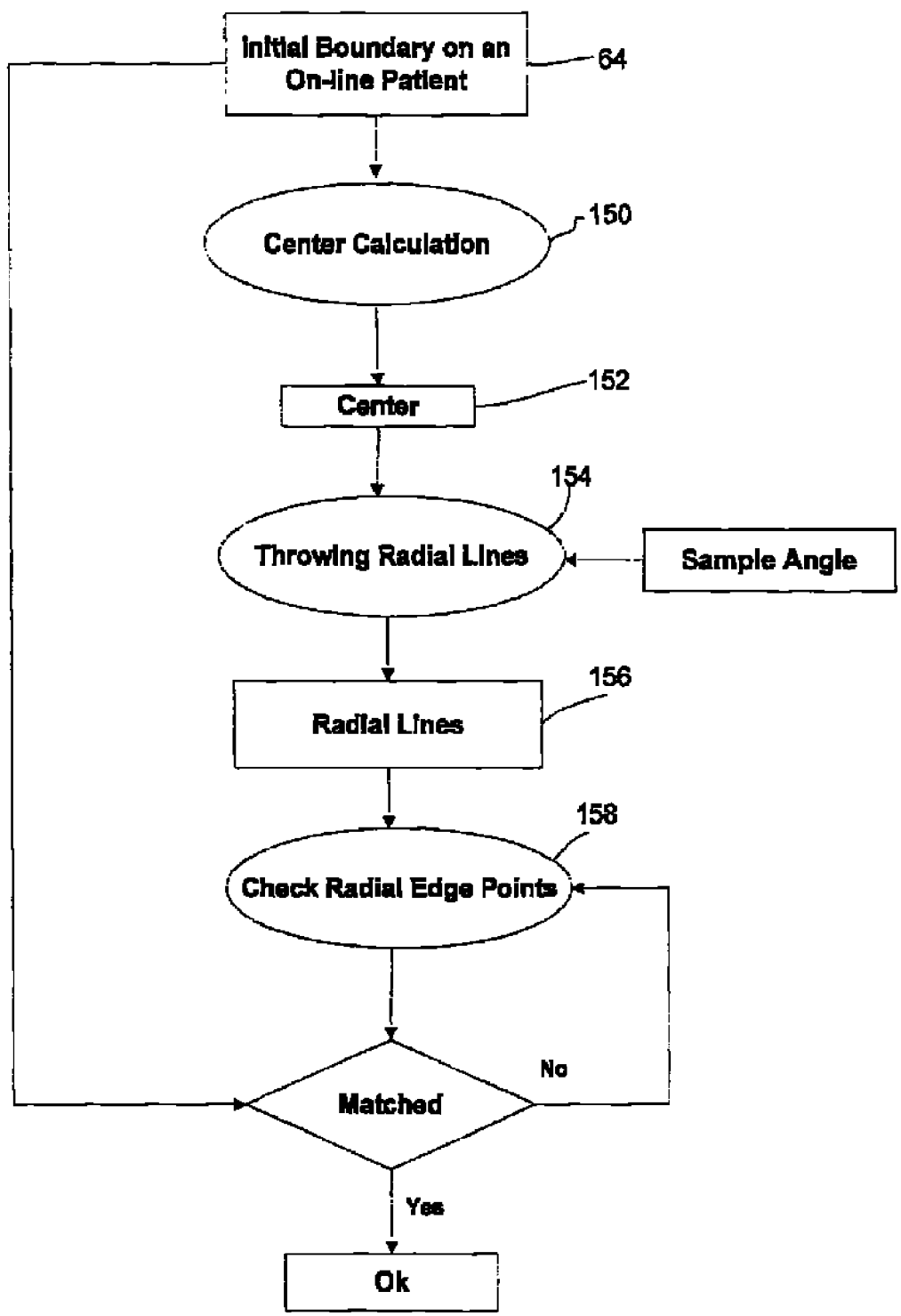
FIG. 8 illustrates process flow diagram for boundary conformation.

Once the initial boundary is obtained 64, the new patient images together with their initial boundaries are analyzed 66 to determine if the initial boundary conforms closely enough to the stored results. If so, the conformed boundary is output to the system. FIG. 8 illustrates a process 150 for determining the conformance of the boundary. The conformance process includes receiving the initial boundary 64 and patient image of an online patient. At such time, a center point is calculated based on the received the image (See FIG. 3B). That is, while the exact boundary of the prostate may not be readily determinable (i.e., is blurred, or otherwise not sharp), a center point of the prostate may be estimated 150 in an automated center calculation. Alternatively, a trained user may identify a few points (e.g. four) within the prostate that allow for center point determination. Radial lines 30 are extended 152 from the center point 32 at a constant sampling angle theta. Points 34 are established on each line 30 where the radial lines 30 cross the initial boundary 14. Once the radial lines are drawn 156, these radial edge points 34 are checked to identify if they are within a predetermined error amount in relation to expected values based on stored data. If not, the process may be repeated to adjust the center point 32 until the radial end points 34 are within a predetermined percentage of the initial boundary 14. Alternatively, the points 34 that are not within a predetermined distance of the initial boundary 14 may be discarded. In any case, the remaining points 34 that are within a predetermined percentage of the initial boundary 14 may be utilized as the initial contour or curve 214 that is fit to the points 34. As will be discussed herein, these initial points are utilized to form a curve that may be adjusted to capture the boundary of the prostate 12. Though shown as utilizing few radial lines 30, it will be appreciated that numerous lines 30 may be utilized based on a small sample angle theta in order to improve conformance of the system. In any case, once the initial points 34 are selected, the boundary is conformed 68 (See FIG. 5) and the initialization system processing is complete. Accordingly, as shown in FIG. 4, once the conformation 68 is completed, the 2-D ultrasound image slice 102 and its initial object boundary 104 are passed to the narrow band mask estimation system 200.

Figure 9:
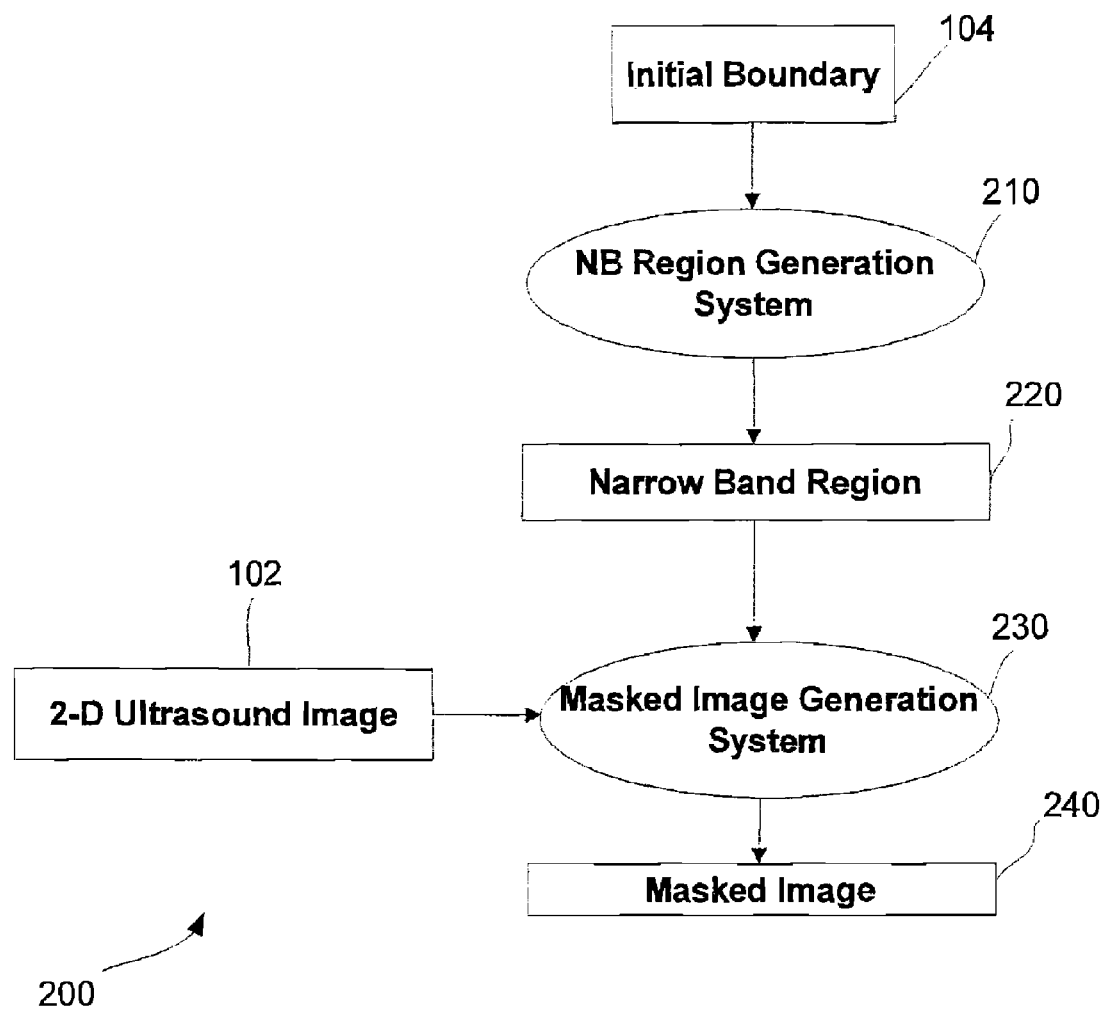
FIG. 9 illustrates a process flow diagram for generation of a narrow band mask.
Figure 10:
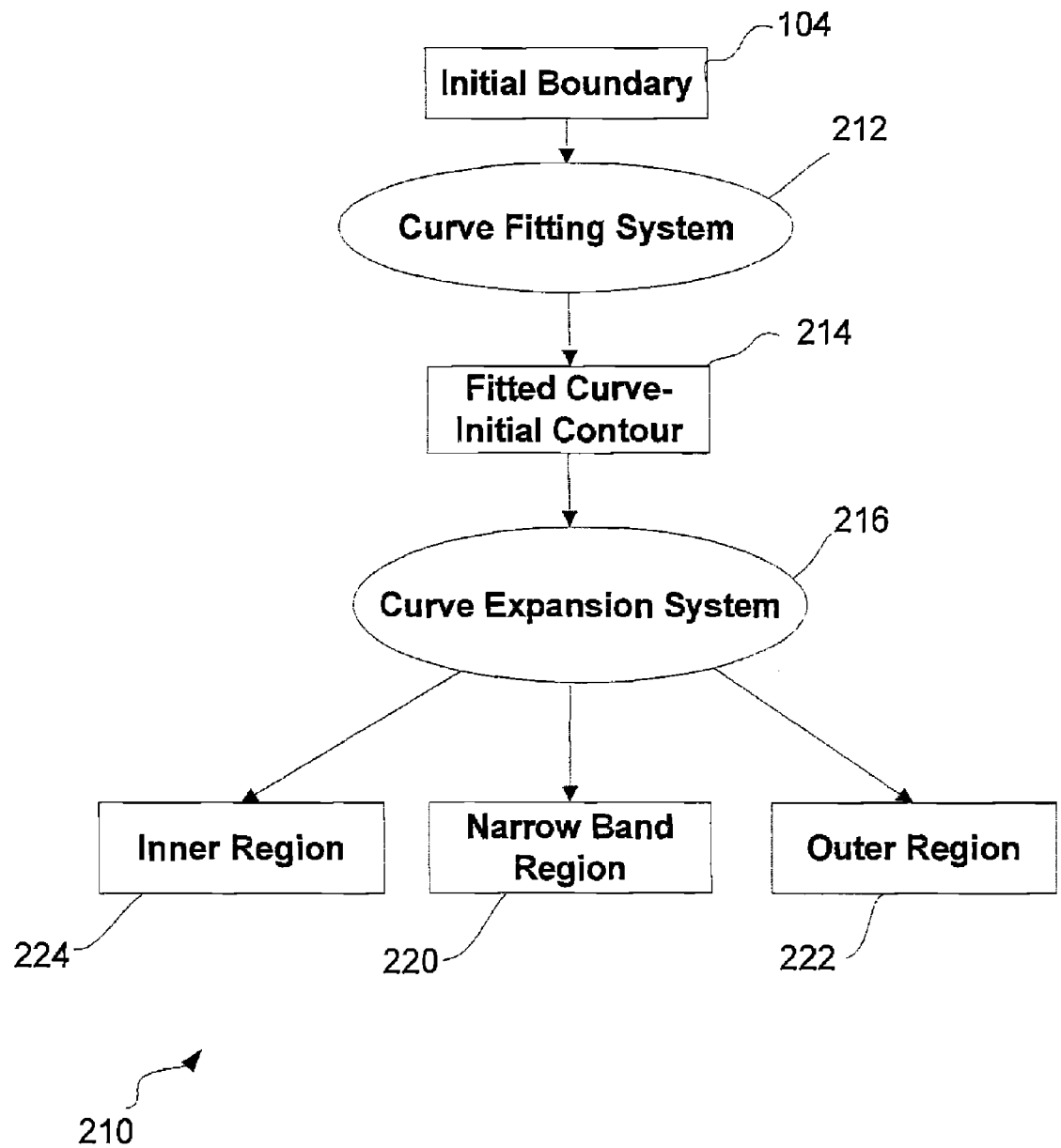
FIG. 10 illustrates a process flow diagram for generation of a narrow band region in the two-dimensional ultrasound image.

The narrow band mask estimation system 200 is described in relation to FIGS. 9 and 10. As shown, the initial boundary 104 is provided to the narrow band region generation system 210. The narrow band region generation system 210 is illustrated in FIG. 10. As shown, the System 210 includes a curve fitting system 212 that fits a smooth curve through the points (i.e., points 34 of FIG. 3B) to form an initial curve or contour 214, which may be deformed to match the actual boundary of the prostrate. The curve expansion system 216 expands the initial contour 214 outward in order to form an outer contour 16 and thereby define a narrow band region 220. The expansion system 216 is operative to expand the curve 214 such that the actual boundary of the object (e.g., prostate) lies within the resulting narrow band 220. Further, portions of the image that are outside the narrow band region 220 define an outer-region 222 and portions that are inside the narrow band region define an inner-region 224.

Referring again to FIG. 9, this narrow band region 220 provided in conjunction with the original two dimensional ultra sound image 102 to a mask image generation system 230. The mask image generation system 230 takes pixels from the two dimensional image in the narrow band 220 for subsequent processing. This masked image 240 along with the inner and outer-regions 222, 224 and the narrow band region 220 are output to the narrow band boundary estimation system 300. See FIG. 4.

The boundary estimation system utilizes active contours within the narrow band to delineate between the background and the structure of interest (prostate gland). Active contours, or "snakes", are dynamic curves or surfaces that move within an image domain to capture desired image features (e.g., edges or boundaries). In the present algorithm, the level set method is applied. In this method, the boundary of the object is implicitly expressed as the zero level of a 3-dimensional function, which is called the level set function (e.g., the initial contour 214). In the present method, use is made of a modification of Chan-Vese's "Active contour without edge" model, IEEE Trans. Imag. Proc., vol. 10, pp. 266-277, 2001, which is incorporated by reference herein. IN this method the images are modeled as "piecewise constant". The method is based on the knowledge about the ultrasound prostate images that the gray levels of the object region (e.g., inner region 224) and the background region (e.g., outer region 222) are different, and in the object region, the pixels are more "homogeneous". The purpose of the method is to find out the minimum of the cost function:

$$E = \int_\Omega m |\nabla H(F)| \, dx \, dy + l_1 \int_\Omega (I_0 - C_1)^2 H(F) \, dx \, dy + \\ l_2 \int_\Omega (I_0 - C_2)^2 (1 - H(F)) \, dx \, dy + P \quad (1)$$

Where the F is the level set function, $I_0$ is the image at pixel (x,y), $C_1$ and $C_2$ are the average intensity in the inner and outer regions which are separated by the contour, the others are the weights of the terms. P is the penalty term which is new in this application:

$$P = p\int_\Omega (1 - |\nabla F|)^2 \, dx\,dy + s\int_\Omega \lfloor I(\text{inner})(1 - H(F)) + I(\text{outer})H(F)\rfloor dx\,dy \quad (2)$$

Where the first integration is the penalized term for keeping the level set function as signed distance function. See Chunming Li, Chenyang Xu, Changfeng Gui, and Martin D. Fox, "Level Set Evolution Without Re-initialization: A New Variational Formulation", IEEE International Conference on Computer Vision and Pattern Recognition (CVPR), pp. 430-436, San Diego, 2005, which is incorporated by reference herein. The second integration is the penalized term to keep the level set function as a single connected curve. In the inner region (which is created by the trained user or established by placement of the initial boundary), the level set function value will be kept as negative, while in the outer region, the level set function will be positive. The second term can avoid the "bleeding" of the contour and keep the contour continuous in the narrow band.

Basically it is needed to take the gradient of the functional according to F and find the steepest descent, and then perform the finite difference calculation for updated F. After certain iterations, F will converge.

$$F_{n+1} = F_n + dt[\text{Delta}(F_n)(l_1(I-C_1)^2 + l_2(I-C_2)^2 + m_1 C(F_n) + sS(F_n)) + pP(F_n)] \quad (3)$$

After the final level set function F is obtained, the edge may be obtained by getting the zero level set of F. There will be some irregularities in the final contour, so down sampling the contour can be performed to make a smooth connection as the estimated boundary.

Figure 11:
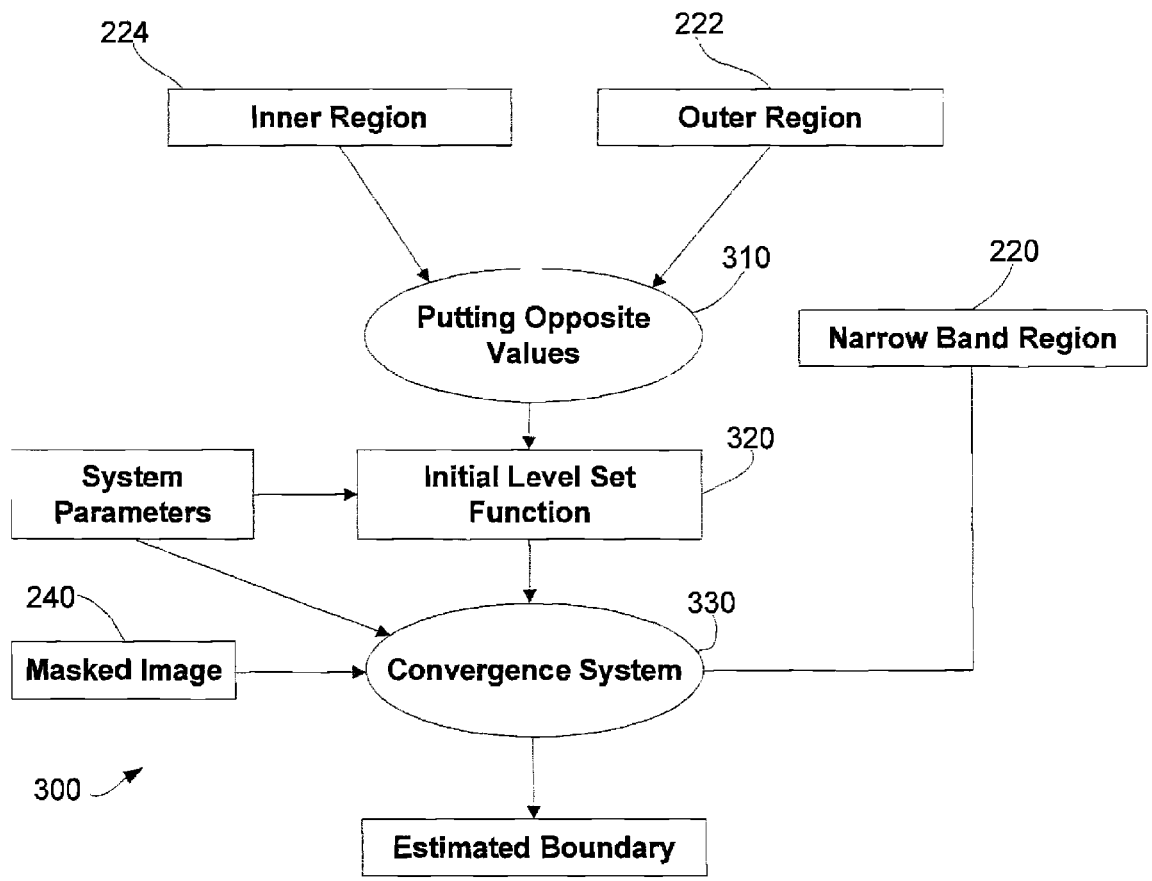
FIG. 11 illustrates process flow diagram for boundary estimation in the narrow band.

FIG. 11 illustrates process flow sheet for the boundary estimation system in the narrow band 300. As shown, the initial level set function 320 may be obtained by generating 310 opposite values for the inner-region 220 and the outer-region 222. Then the initial level set function 320 together with empirical system parameters and the narrow band region 220 and the mask image 240 will enter the convergent system 330. As discussed above and herein, the convergence system 330 performs a finite difference update output of which is the estimated boundary.

Figure 3C:
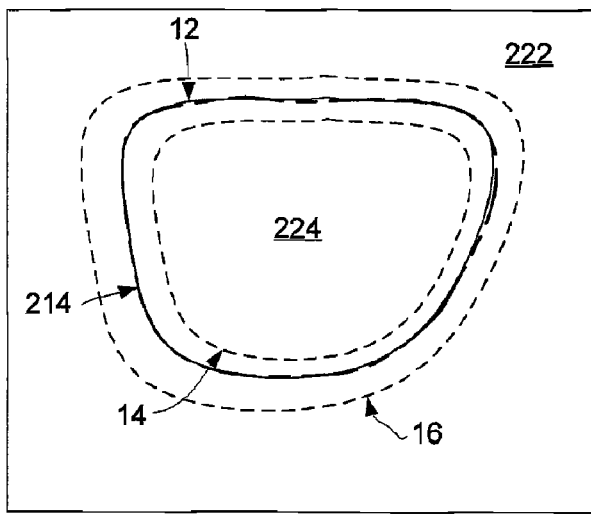
FIG. 3c illustrates capture of the boundary of the prostrate boundary in the narrow band region.
Figure 12:
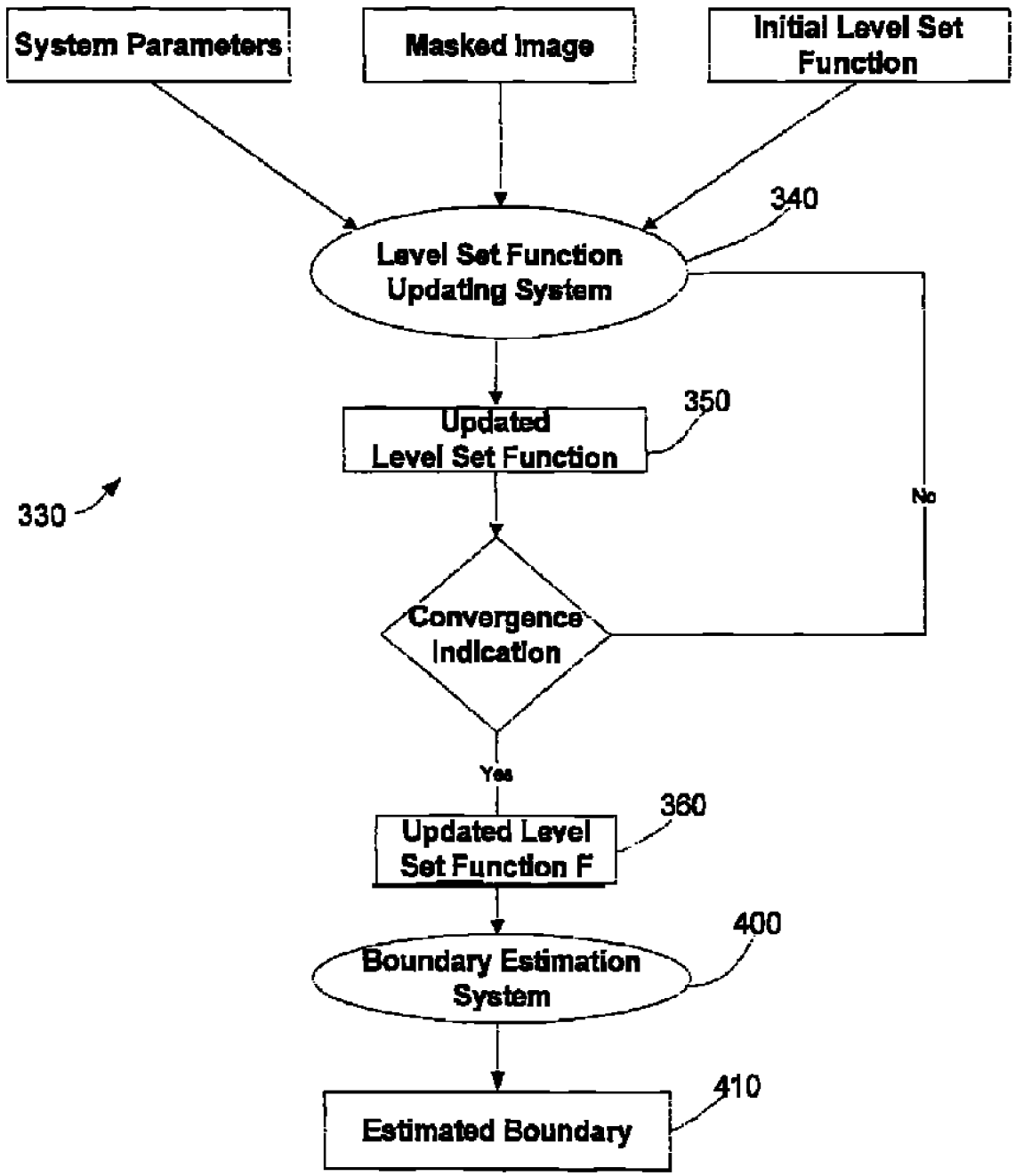
FIG. 12 illustrates a process flow sheet for a convergent system for updating the level set function.

FIG. 12 shows a process flow sheet of the convergence system 330. Generally, the convergence system calculates finite difference iterations. Utilizing the system parameters vast image 240 and initial level set function 320. That is, the initial level set functions put into the convergent system 330 and the finite difference calculation is performed for the function F by the level set function updating system 340. For each difference calculation, that is updated 350, this process is repeated until there is a convergence indication. At such time, the updated level set function 360 is output to the boundary estimation system 400, which utilizes the information to generate an estimated boundary 410 (i.e., by getting the zero level set of F). The estimated boundary 410 represents the conformance of the function F (which prior to iteration was represented by initial boundary 214) with the boundary of the prostrate 12. See FIG. 3c.

Figure 13:
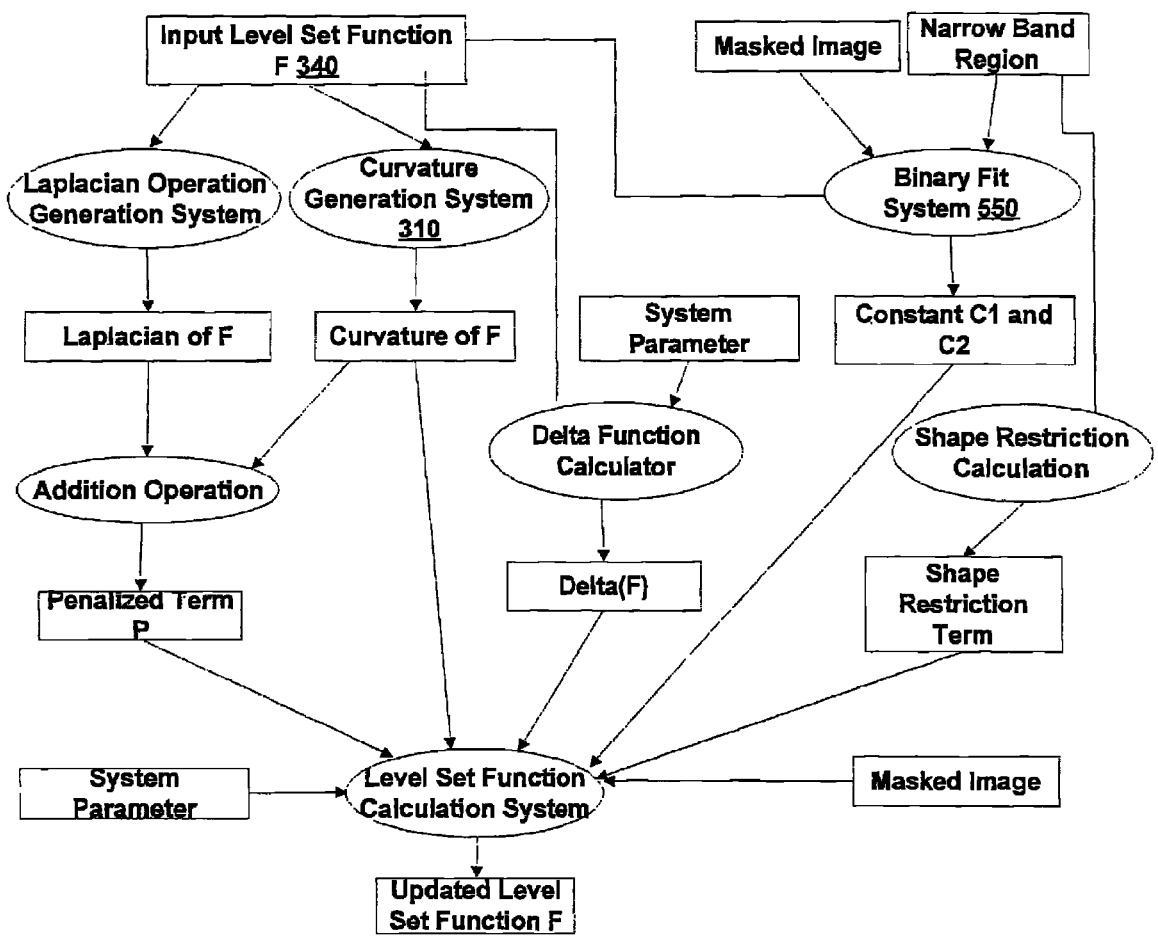
FIG. 13 illustrates a process flow diagram for the level set function updating system.

FIG. 13 illustrates a process flow sheet of the level set function updating system 340. Specifically, FIG. 13 illustrates the process performed for each iteration of the level set function. As shown, the current level set function 340 is input into the system. The combination of the Laplacian of F and the curvature of F will be the penalized term of equation 2. In addition, a delta function is calculated. Constants C1 and C2 are also calculated. Each of these values is provided to level set function calculation system 500 in order to generate the updated level set function. The calculation is given by equation (3). Where $C_1$ and $C_2$ are the average values in the 2 different regions, and they will be obtained in the Binary Fit System. Delta(F, e), is the approximation of the impulse function with system parameter e. P is the penalized term for shaping of SDF and will be obtained by adding the curvature and Laplacian of the level set function. The calculation of Delta function is provided by the approximation:

$$\text{Delta}(e, F)\frac{e}{\pi} \cdot (F^2 + e^2) \quad (4)$$

Where e is a system parameter.

R is the level set function shaping term. $l_1, l_2, r, m_1$ and $m_2$ are the weights for each of the terms. At each step n, the n+1th level set function $F_{n+1}$ will be updated with the current $F_n$ and the terms related to $F_n$. Each update is calculated in Level Set Updating System. The updated level set function will be the output.

Figure 14:
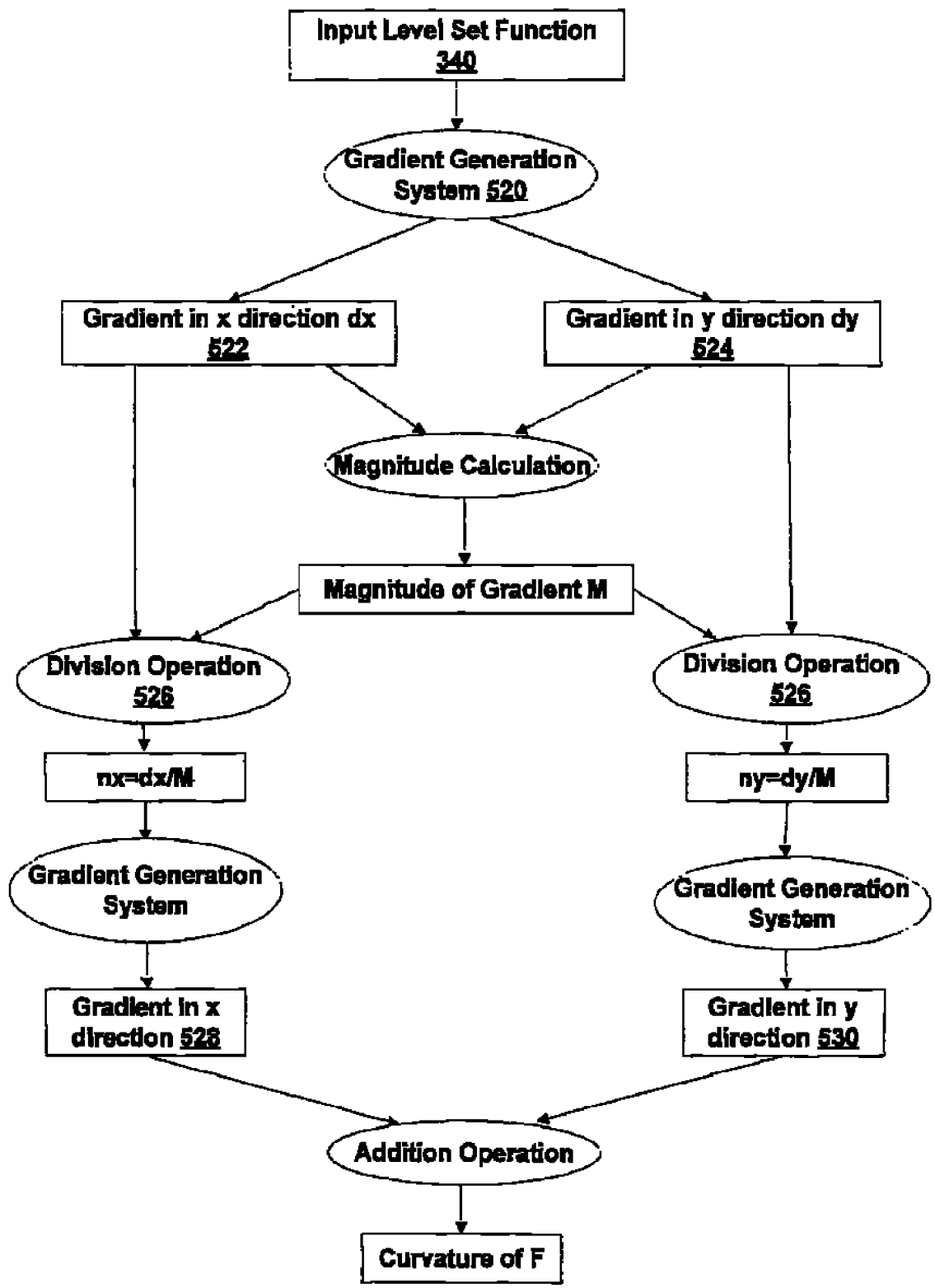
FIG. 14 illustrates a process flow diagram for a curvature generation system for use in the level set updating system.

Curvature generation system 510, See FIG. 14, is operative to receive the input level set function 340 generate gradients in an X direction 522 and generate gradients in a Y direction 524. Utilizing a gradient generation system 520. As it will be appreciated, the curvature of the function is defined as:

$$\text{Curv}(F) = \text{div}\left(\frac{\partial F}{|\partial F|}\right) \quad (5)$$

Where $$\text{div}(v) = \frac{\partial v}{\partial x} + \frac{\partial v}{\partial y} \quad (6)$$

Where v is a vector. In the calculation, we firstly get the gradients in x, y directions of level set function F. Then the magnitude of $|\partial F|$ is calculated. At last, the divergence of $$\frac{\partial F}{|\partial F|}$$

is calculated, which is the output-curvature of F.

A magnitude calculation is performed on each gradient X (522) and Y (524). This magnitude may be divided 526 into each gradient to normalize the X and Y gradients. The normalized X and Y gradients 528 and 530 mayo be combined to generate the output curvature of F.

Figure 15:
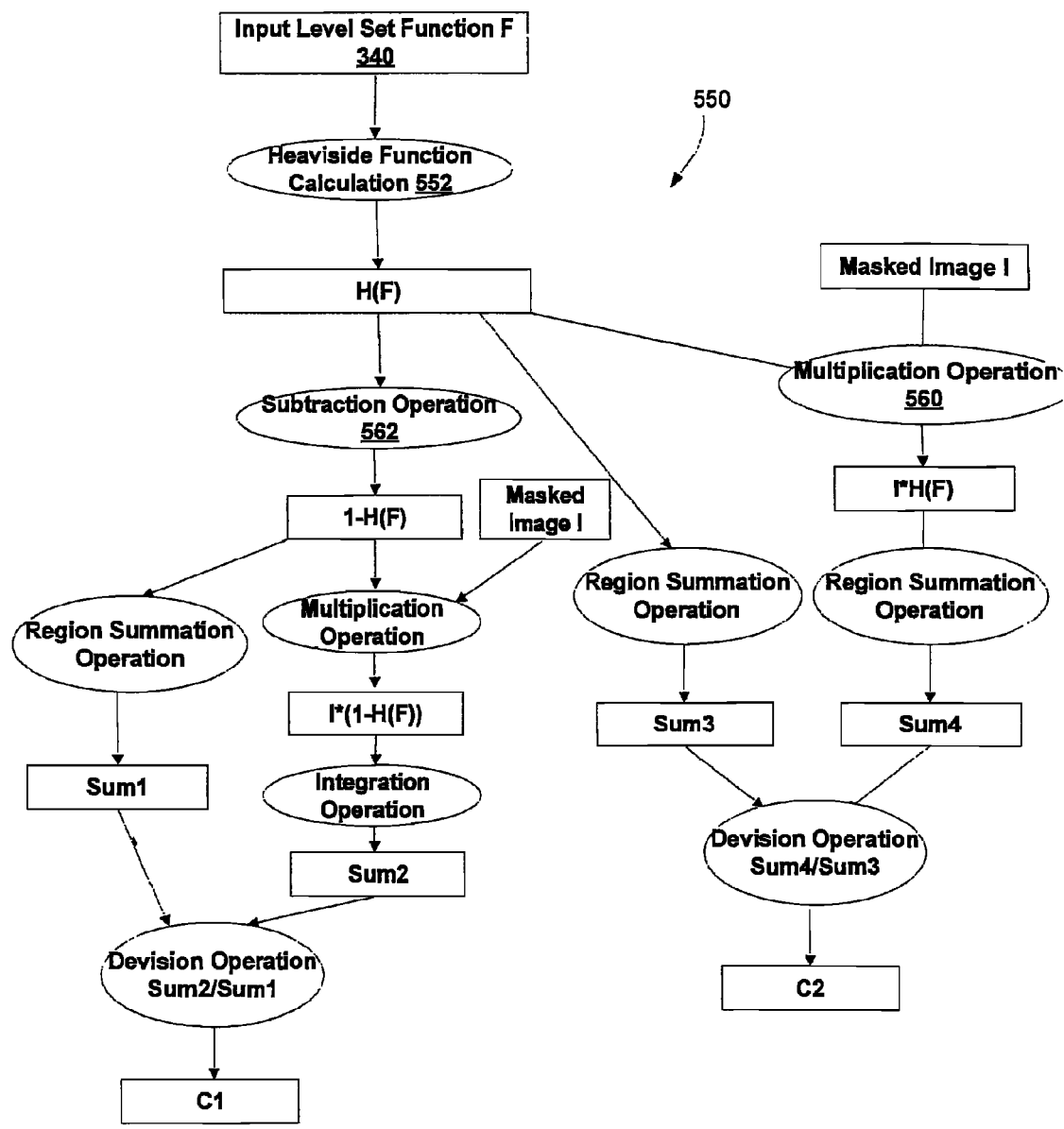
FIG. 15 illustrates a process flow diagram for a binary fit system.

The binary fit system 550 FIG. 13 is more fully discussed in relation to FIG. 15 and is utilized to calculate the constants of C1 and C2 for the input level set function F. Accordingly, the binary fit system 550 receives the input level set function F (340). This system is to calculate the average value in each of the regions which are separated by the upper and lower side of the level set function:

$$C_1 = \frac{\text{sum}(H(F) * I)}{\text{sum}(H(F))} \quad (7)$$

$$C_2 = \frac{\text{sum}((1 - H(F)) * I)}{\text{sum}(1 - H(F))} \quad (8)$$

Where H(F) is the Heaviside Function.

In the system, the level set function is input, and all the terms in equation (7) and (8) are calculated respectively. All the calculations are carried out in the narrow band region. And the output will be the average value of each region.

The calculation of Heaviside function is provides by the approximation:

$$H(e, F) = \frac{1}{2} \cdot \left(1 + \frac{2}{\pi}\arctan\left(\frac{F}{e}\right)\right) \quad (9)$$

Where e is the system parameter.

Figure 16A:
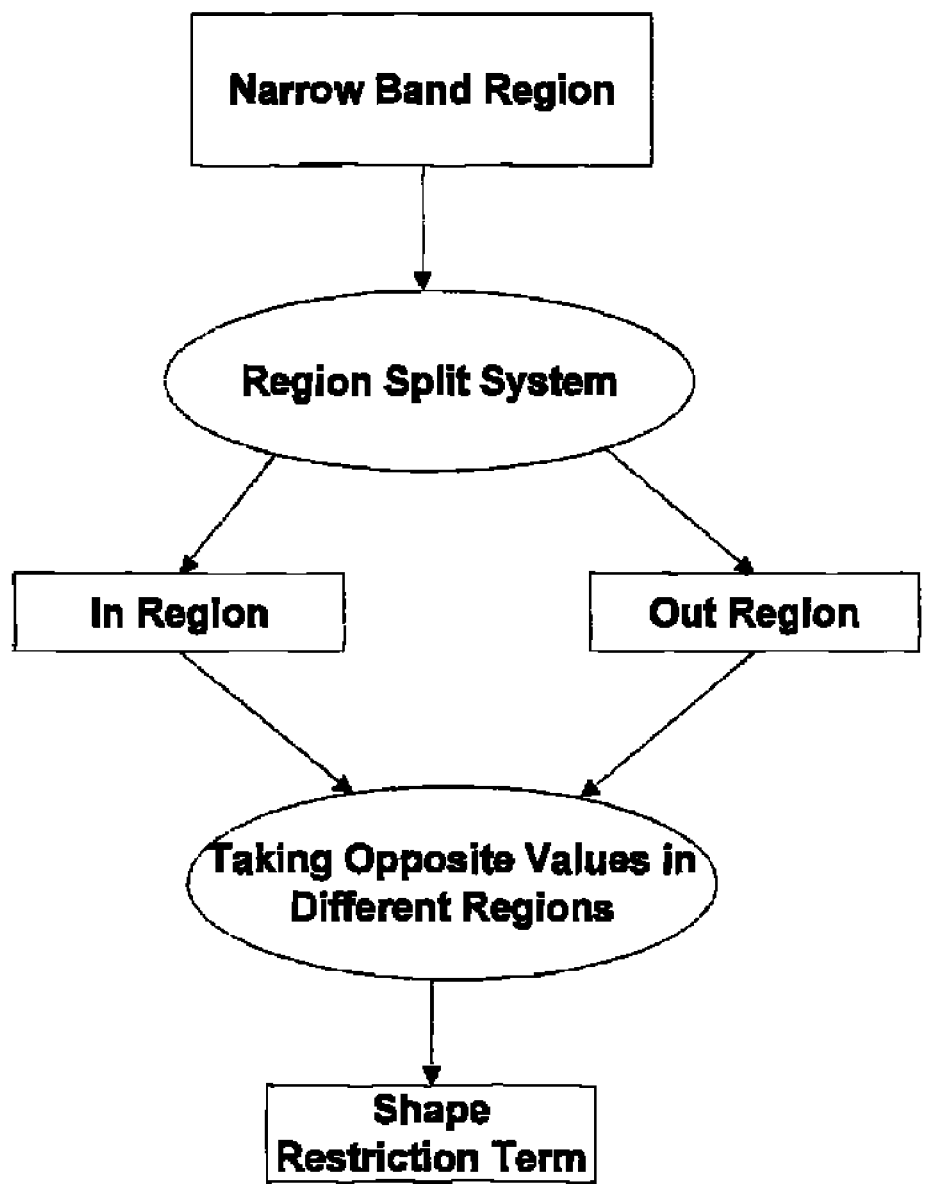
FIG. 16a illustrates a process flow diagram of a shape restriction calculation.
Figure 16B:
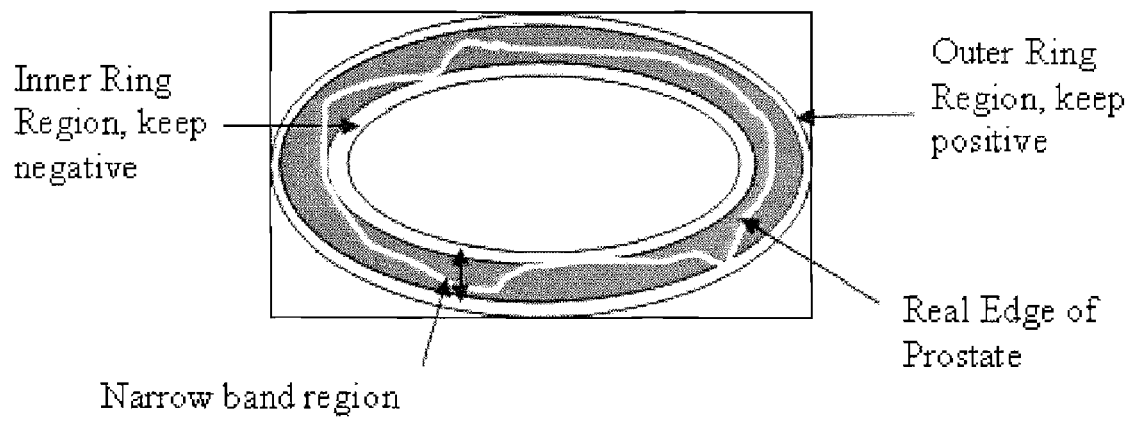

FIGS. 16*a* and 16*b* shows a process flow diagram and an exemplary implementation of the shape restriction calculation of FIG. 13. The term may be calculated as follows:

$$S(x, y) = \begin{cases} -s & (x, y) \in \text{inner} \\ s & (x, y) \in \text{outer} \\ 0 & \end{cases} \quad (10)$$

Where inner refers to inner "ring" region in the narrow band, and outer refers to outer "ring" region in the narrow band, both are obtained in Region Split System, and s is a positive system parameter. Thus level set function will keep "negative" in the inner region and "positive" in the outer by the penalized term.

Figure 17:
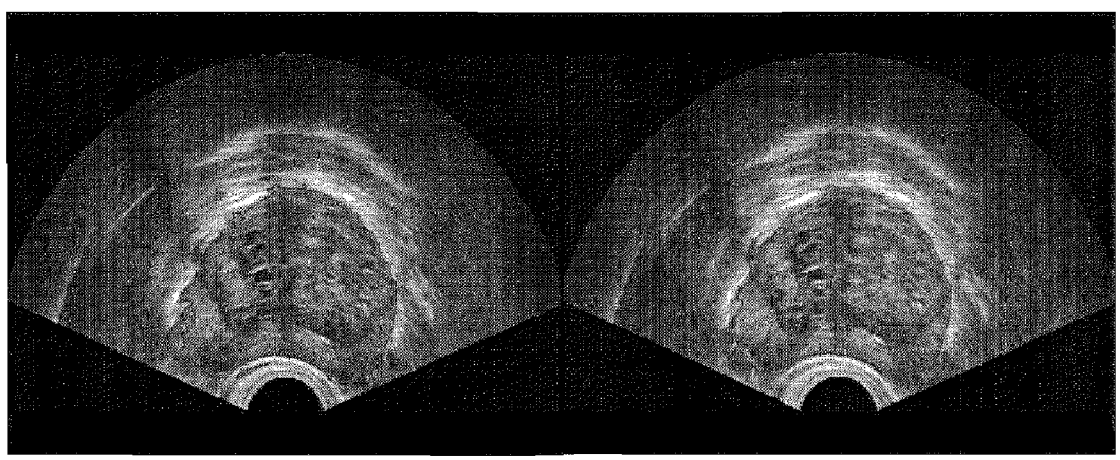
FIG. 17 illustrates the segmentation of a prostrate boundary from background information.

FIG. 17 illustrates the advantage of the current invention. Since the curve evolution is based on the topology of the image and it can handle the split and merging naturally. As shown, the left hand image illustrates the bleeding contours and the right hand image illustrates a converged contour as generated by the above noted processes.

In the present embodiment of the invention, a level set frame work for prostate ultrasound images is presented. The method is automatic. Calculations are performed in the narrow region which is generated by the prior information (e.g., boundary models) and the actual edge information of the image. The invention is based on the regional information of the image, and re-initialization of the image is totally eliminated making the computation very stable. The curve evolution is based on the topology of the image and it can handle split and merging naturally. Further the method can obtain very good accuracy within the narrow band calculation. It is simpler to implement and can be very fast due to the narrow band framework applied.

Generally, the iterative calculations of the function F allow for deforming the function F in the narrow band region inwardly and outwardly in order to catch the boundary of the prostate 12. See for example FIG. 3*c*. This is done utilizing the contrast between the inner and outer-regions and/or the contrast between the inner and outer rings within the narrow band. Further, by minimizing the cost function while applying a penalty term, deformation speed of the function is reduced to prevent or reduce rapid expansion or contraction that can cause "bleeding" of the contour.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

The invention claimed is:

1. A method for use in obtaining a boundary of a structure within a medical ultrasound image, through a segmentation algorithm stored in computer readable program, comprising:
   obtaining an ultrasound image including a structure of interest;
   providing an initial estimate of said boundary, wherein said initial estimate is based on a predetermined model;
   based on said initial estimate boundary, generating a narrow band region including an actual boundary of said structure;
   processing said narrow band region to generate an estimation of said actual boundary of said structure;
   fitting a curve to said initial estimate boundary, wherein said curve defines an initial level set function;
   minimizing a cost functional defined in the narrow band region with the initial level set function; wherein the steps for minimizing the cost functional with regard to the level set function comprise:
   calculating an internal length speed in the narrow band region;
   calculating two regional speeds in the narrow band region;
   calculating a shape constraints speed in the narrow band region;
   calculating a penalized re-initialization constraints speed in the narrow band region;
   updating the level set function.

2. The method of claim 1, wherein providing said initial estimate of said boundary comprises providing a predetermined model boundary that is based on at least one of age and ethnicity.

3. The method of claim 2, further comprising:
   making an initial placement of said model boundary on said image.

4. The method of claim 3, further comprising:
   finding a center point of the structure of interest;
   generating radial lines from the center point;
   identifying boundary points where the center lines cross the model boundary.

5. The method of claim 4, further comprising:
   fitting a curve to at least a least a portion of said boundary points.

6. The method of claim 5, wherein said curve is a closed curve and generating said narrow band region comprises one of expanding said curve outward to generate an outer boundary of said narrow band region or contracting said curve inward to generate an inward boundary of said narrow band region.

7. The method of claim 1, further comprising:
   initialing the level set function in the narrow band region based values from an inner region inside of said narrow band region and an outer region outside of said narrow band region.

8. The method of claim 7, wherein the initialing the level set function in the narrow region based on the inner and outer region obtained in claim 2 includes:
   setting the level set function in inner region to $-\alpha$, where a is the system constant;
   setting the level set function in outer region to $\alpha$.

9. The method of claim 1, wherein the cost functional of level set function F(x,y) defined in the narrow region includes the weighted integration of: the length of the contour, the regional energies in the narrow band region, the shape-constraints in the narrow band region and the penalized re-initialization constraint in the narrow band region.

10. The method of claim 1, further comprising interactively repeating said calculating and updating steps until convergence.

11. The method of claim 1, wherein the calculation of the internal length speed in the minimization process includes:
   calculating a delta functional in the narrow band region as:

$$\text{Delta}(e, F) = \frac{e}{\pi} \cdot (F^2 + e^2) \quad (12)$$

where e is a system constant parameter; and
   calculating the curvature of the level set function in the narrow band region as:

$$\text{Curv}(F) = \text{div}\left(\frac{\partial F}{|\partial F|}\right). \quad (13)$$

12. The method of claim 1, wherein the calculation of the regional speeds in the minimization process includes:
   calculating the regional energy functional of the level set function in the narrow band region as:

$$F_1 = (I - C_1)^2 \quad (14)$$

$$F_2 = (I - C_2)^2 \quad (15)$$

where $C_1$ and $C_2$ are the constant values which are updated during each iteration, and I is the input intensity of the image in the narrow band region and
   calculating the multiplication of the delta function with (14) and (15) respectively.

13. The method of claim 12, wherein the calculation of the regional speeds, the calculation of the constants $C_1$ and $C_2$ in the narrow band region includes:
   calculating a Heaviside Functional:

$$H(e, F) = \frac{1}{2} \cdot \left(1 + \frac{2}{\pi}\arctan\left(\frac{F}{e}\right)\right) \quad (16)$$

where e is the system parameter; and
calculating constants $C_1$ and $C_2$ as following in the narrow band region:

$$C_1 = \frac{\text{sum}(H(F) * I)}{\text{sum}(H(F))} \quad (17)$$

$$C_2 = \frac{\text{sum}((1 - H(F)) * I)}{\text{sum}(1 - H(F))}. \quad (18)$$

14. The method of claim 1, wherein the calculation of the shape constraint speeds in the minimization process includes:
   calculating a shape term in the narrow band region:

$$S(x, y) = \begin{cases} -s & (x, y) \in \text{inner} \\ s & (x, y) \in \text{outer} \\ 0 \end{cases} \quad (19)$$

where inner refers to inner "ring" in the narrow band region, and outer refers to outer "ring" region in the narrow band region, and s is the system parameter.

15. The method of claim 1, wherein the calculation of the re-initialization penalized constraint speeds in the minimization process includes:
   calculating a Laplacian of level set function as:

$$\frac{\partial^2 F}{\partial x^2} + \frac{\partial^2 F}{\partial y^2} \quad (20)$$

and calculating the subtraction of (20) with the curvature of the level set function in the narrow band region.

16. The method of claim 1, wherein the updating of the level set function in the minimization process includes:
   multiplying each speed function with system defined weights in the narrow band region;
   adding all the multiplied results in the narrow band region; and
   adding the input level set function with the added weighted terms.

17. The method of claim 1, further comprising:
   obtaining a contour from the level set function includes by obtaining a zero level of the level set function in the narrow band region.

* * * * *

UNITED STATES PATENT AND TRADEMARK OFFICE
CERTIFICATE OF CORRECTION

PATENT NO. : 7,804,989 B2
APPLICATION NO. : 11/615596
DATED : September 28, 2010
INVENTOR(S) : Suri et al.

It is certified that error appears in the above-identified patent and that said Letters Patent is hereby corrected as shown below:

Column 1, line 33, delete "prostrate" and insert therefor --prostate--.
    Column 4, line 49, delete "illustrate" and insert therefor --illustrates--.
    Column 5, line 5, delete "prostrate" and insert therefor --prostate--.
    Column 5, line 7, delete "prostrate" and insert therefor --prostate--.
    Column 6, lines 35-36, delete "prostrate" and insert therefor --prostate--.
    Column 10, line 59, delete "mayo" and insert therefor --may--.

Signed and Sealed this

Thirtieth Day of November, 2010

David J. Kappos
*Director of the United States Patent and Trademark Office*